(12) United States Patent
Kim

(10) Patent No.: US 7,841,362 B2
(45) Date of Patent: Nov. 30, 2010

(54) WATER CONTROL VALVE

(76) Inventor: Jong Koo Kim, 207-304 DaeLim 2cha Apt. 924 Dongchun 1, dong, Yeonsu-gu, Incheon 406-131 (KR)

( * ) Notice: Subject to any disclaimer, the term of this patent is extended or adjusted under 35 U.S.C. 154(b) by 792 days.

(21) Appl. No.: 11/721,034

(22) PCT Filed: Jul. 5, 2005

(86) PCT No.: PCT/KR2005/002131

§ 371 (c)(1),
(2), (4) Date: Jun. 6, 2007

(87) PCT Pub. No.: WO2006/070987

PCT Pub. Date: Jul. 6, 2006

(65) Prior Publication Data

US 2010/0032037 A1    Feb. 11, 2010

(30) Foreign Application Priority Data

Dec. 29, 2004    (KR)    ........................ 10-2004-0115142

(51) Int. Cl.
*F16K 11/072* (2006.01)
(52) U.S. Cl. ............... 137/637; 137/637.3; 137/625.17; 137/625.46; 137/454.6
(58) Field of Classification Search ............... 137/597, 137/625.17, 625, 4, 637, 454.6, 454.5, 637.3, 137/625.46
See application file for complete search history.

(56) References Cited

U.S. PATENT DOCUMENTS 4,653,538 A * 3/1987 Tsutsui et al. ............... 137/597
5,417,242 A * 5/1995 Goncze ................. 137/625.17

* cited by examiner

*Primary Examiner*—Kevin L Lee
(74) *Attorney, Agent, or Firm*—Park & Associates IP Law LLC

(57) ABSTRACT

A water control valve, which has one valve cartridge to control the temperature and flow rate of hot water, cold water or a mix of hot and cold water only through rotating motions, is disclosed. The valve cartridge (100) has a first fixed disk (120) to guide hot and cold water into the valve cartridge, a rotary disk (130) to control the flow rate of hot and cold water from the first fixed disk, thus controlling the temperature of water, a second fixed disk (140) to guide controlled water in the cartridge, a temperature control unit (170) to rotate the rotary disk during rotation of a temperature control lever, the moving unit (150) to linearly move toward or away from the second fixed disk, thus controlling the flow rate of discharged water, and a flow rate control unit (160) to cause linear movement of the moving unit by rotation.

14 Claims, 7 Drawing Sheets

WATER CONTROL VALVE

REFERENCE TO RELATED APPLICATIONS

This is a continuation of pending International Patent Application PCT/KR2005/002131 filed on Jul. 5, 2005, which designates the United States and claims priority of Korean Patent Application No.10-2004-0115142 filed on Dec. 29, 2004.

FIELD OF THE INVENTION

The present invention relates, in general, to water control valves, which are called "faucets" in the related art, and, more particularly, to a water control valve which controls the temperature of water by mixing hot and cold water and controls the flow rate of the hot water, cold water or a mix of hot and cold water only through rotating motions, and has both a temperature control lever and a flow rate control lever provided at a side of a valve body, thus allowing a user to easily manipulate the two control levers to precise angles, and in which the two control levers do not interfere with each other during operation so that the valve changes neither the existing flow rate of water during temperature control operation nor the existing temperature of water during flow rate control operation.

BACKGROUND OF THE INVENTION

Generally, a water control valve, which is called a "faucets" in the related art, has been configured to control the flow rate of water (including hot water supplied from a boiler), and to control the temperature of water by selecting cold water or hot water, or by mixing cold water and hot water at a desired mixing ratio.

The water control valve capable of controlling the temperature and flow rate of water may be installed in a kitchen at an appropriate position above a sink or in a bathroom at a predetermined position above, for example, a bathtub. A user in the kitchen or the bathroom thus conveniently uses water by manipulating the water control valve.

Conventional water control valves capable of controlling the temperature and flow rate of water have been classified into knob-operated valves and lever-operated valves. The knob-operated water control valves are configured to control the flow rate and temperature of water using respective knobs which are designated for cold water and hot water and manipulated by a user to control the flow rate of water as well as the temperature of water. The lever-operated water control valves are configured to control the flow rate of water by moving a lever upwards or downwards, and control the temperature of water by appropriately rotating the lever leftwards or rightwards to select cold water, hot water, or a mix of the cold water and hot water together.

Described in detail, in the conventional knob-operated water control valves, a cold water knob and a hot water knob are provided on opposite sides of a valve body. The cold water knob is manipulated to discharge cold water at a controlled flow rate, while the hot water knob is manipulated to discharge hot water at a controlled flow rate.

Thus, when it is desired to use cold water or hot water exclusively, a user can easily control the flow rate of water by manipulating a knob designated for cold water or hot water. However, when it is desired to use mixed water of a desired temperature, the cold water knob and the hot water knob must be carefully manipulated to provide the desired temperature, resulting in inconvenience to users.

Furthermore, the conventional knob-operated water control valves each have a plurality of valve cartridges used for separately controlling the flow rates of cold water and hot water. The valve cartridges of each conventional knob-operated water control valve comprise many elements, complicating the construction of the water control valves.

Due to the plurality of valve cartridges having many elements, the conventional knob-operated water control valve has a complex and crude appearance. Thus, the conventional knob-operated valve does not appeal to the taste of modern people preferring a simple and refined appearance to a complex and crude appearance. Furthermore, due to the provision of the plurality of valve cartridges in a knob-operated valve, production costs of the valve are increased.

The conventional lever-operated water control valves are problematic in that they needlessly waste an excessive amount of water because the lever-operated valves cannot precisely control the flow rate of water.

Most conventional lever-operated water control valves are designed as single lever-type valves each having one lever, inducing a manipulation problem in which the valves may change the existing flow rate of water during a temperature control operation and change the existing temperature of water during a flow rate control operation.

Described in detail, a user of a conventional lever-operated water control valve having a single lever must control the temperature and flow rate of water by manipulating the single lever. To control the temperature of water, the user manipulates the single lever so that a control disk of the valve is rotated leftwards or rightwards, thereby adjusting the opening ratios of hot and cold water inlet holes and controlling the mixing ratio of hot and cold water. Thus, the temperature of water to be discharged from the valve is controlled. To control the flow rate of water, the user manipulates the single lever to move the control disk forwards or backwards, thus adjusting the opening ratio of a water discharge hole and controlling the flow rate of water to be discharged from the valve. Therefore, the conventional lever-operated water control valves having single lever have the above-mentioned manipulation problem.

Furthermore, in the operation of the conventional lever-operated water control valves having the single lever, the lever cannot be precisely manipulated, so that excessive time is required to control the temperature of water to a desired point during which an excessive amount of water is discharged from the valve and is needlessly wasted. In addition, the users of the lever-operated water control valves unintentionally fully open the valves, thereby wasting an excessive amount of water.

SUMMARY OF THE INVENTION

Accordingly, the present invention has been made keeping in mind the above problems occurring in the prior art, and an object of the present invention is to provide a water control valve which controls the temperature of water by mixing hot and cold water and controls the flow rate of the hot water, cold water or a mix of hot and cold water only through rotating motions, and has both a temperature control lever and a flow rate control lever provided at a side of a valve body, thus allowing a user to easily manipulate the two control levers to precise angles, and in which the two control levers do not interfere with each other during operation so that the valve changes neither the existing flow rate of water during temperature control operation nor the existing temperature of water during flow rate control operation.

In order to accomplish the above object, the present invention provides a water control valve, which is configured to control the temperature of water by mixing hot and cold water and to control a flow rate of the hot water, cold water or a mix of the hot and cold water, comprising a valve cartridge, the valve cartridge comprising: a first fixed disk to guide hot and cold water flowing from outside water pipes into a valve cartridge through hot and cold water inlet holes thereof; a rotary disk with a temperature control hole formed through the rotary disk, so that the rotary disk controls by rotation the flow rate of hot and cold water according to an amount that the temperature control hole overlaps the hot and cold water inlet holes of the first fixed disk, thus controlling the temperature of water; a second fixed disk with a water passage hole formed through the second fixed disk within a predetermined rotational angular range of the temperature control hole of the rotary disk, thus guiding the hot water, cold water or the mix of the hot and cold water in the valve cartridge, the second fixed disk also supporting the rotary disk against the first fixed disk; a temperature control unit coupled to the rotary disk at a first end thereof and received into a cartridge housing at a second end thereof such that the second end is exposed outside the cartridge housing, with a temperature control lever coupled to the exposed second end of the temperature control unit so that the temperature control unit rotates the rotary disk within a predetermined rotational angular range during rotation of the temperature control lever; first, second and third water discharge holes formed through the first fixed disk, the rotary disk and the second fixed disk, respectively, such that the first, second and third water discharge holes communicate with each other, thus discharging the hot water, cold water or the mix of the hot and cold water from the valve cartridge; the moving unit to linearly move toward or away from the water discharge hole of the second fixed disk, thus controlling a gap between the moving unit and the water discharge hole of the second fixed disk and controlling the flow rate of discharged water; and the flow rate control unit receiving therein the moving unit and causing linear movement of the moving unit, the flow rate control unit being inserted through stop bushing into the temperature control unit such that an end of the flow rate control unit protrudes from the temperature control unit; the stop bushing to prevent the interference between flow rate control unit and temperature control unit and having two radial stoppers and locking protrusion at the opposite side of the radial stoppers.

In the water control valve, the first fixed disk may be inserted into a cartridge base block and guides the hot and cold water from the cartridge base block into the valve cartridge through the hot and cold water inlet holes, and has the water discharge hole to discharge the inlet water.

In the water control valve, the first fixed disk may be a circular ceramic disk having a predetermined thickness in which the hot and cold water inlet holes are formed within a semicircular range while being separated from each other such that each of the hot and cold water inlet holes has an arc shape with a 90° angle around a center of the first fixed disk.

The water discharge hole of the first fixed disk may be formed through the center of the first fixed disk.

The rotary disk may be in surface contact with the first fixed disk and is rotated by rotation of the temperature control unit, thus controlling opening ratios of hot and cold water inlet holes of the first fixed disk by the temperature control hole thereof, and comprises: the second water discharge hole formed through the rotary disk at a position corresponding to the water discharge hole of the first fixed disk; and a locking groove provided on a circumferential outer surface of the rotary disk and fitted to an end of the temperature control unit.

The rotary disk may be a circular ceramic disk having a predetermined thickness, with the temperature control hole formed as an arc-shaped hole with an angle less than ½ of the total of the angles of the hot and cold water inlet holes of the first fixed disk.

The second fixed disk may be in surface contact with the rotary disk and comprises: the water passage hole formed through the second fixed disk within the predetermined rotational angular range of the temperature control hole of the rotary disk; the third water discharge hole formed through the second fixed disk at a position corresponding to the water discharge hole of the rotary disk; a locking protrusion provided on a circumferential outer surface of the second fixed disk and inserted between stop protrusions of the cartridge housing; and an axial guide rib formed on an inner surface of the third water discharge hole and engaging with an axial guide groove of the moving unit, thus guide the linear movement of the moving unit.

The second fixed disk may be a circular ceramic disk having a predetermined thickness. The moving unit may have a cylindrical shape with a predetermined length and comprises: an external thread formed around a first end of the moving unit; a guide projection extending from a second end of the moving unit, with an axial guide groove formed along the guide projection and engaging with an axial guide rib of the second fixed disk; and a water control member provided around the second end of the moving unit opposite the external thread.

The external thread may be formed around the moving unit within a predetermined angular range to allow the moving unit to linearly move relative to the flow rate control unit during rotation of the flow rate control unit.

The external thread may be formed around the moving unit to form a half turn, one turn or two or more turns within an axial length to which the moving unit moves from a retracted position thereof and reaches the water discharge hole of the second fixed disk.

The water control member of the moving unit may be a rubber packing.

The flow rate control unit may have a cylindrical shape with a predetermined length and comprises: a radial protrusion provided on a circumferential outer surface of the flow rate control unit at a predetermined position to limit a rotational angle of the flow rate control unit; a bore axially formed at an end of the flow rate control unit and receiving the moving unit therein such that the moving unit linearly moves in the bore; and a guide thread formed on a circumferential inner surface of the bore and engaging with an external thread of the moving unit.

The rotational angle of the flow rate control unit having the radial protrusion may be limited by a stopper provided at an end of a stop bushing.

The temperature control unit may protrude from the cartridge housing at the second end thereof from which the flow rate control unit protrudes, and comprises: an extension arm axially extending from each of diametrically opposite positions of the temperature control unit; and a locking protrusion provided at an end of the extension arm and fitted to a locking groove of the rotary disk.

The stop bushing may be inserted into the temperature control unit, thus forming a sealed space above the second fixed disk and preventing the interference between flow rate control unit and temperature control unit, with the stopper which comes into contact with the radial protrusion of the flow rate control unit and limits the rotational angle of the flow rate control unit. The stop bushing also has a locking protrusion at the other end opposite the stopper so that the locking protrusion engages with the gap between the stop protrusions provided on the inner surface of the cartridge housing.

The cartridge housing may be coupled to the cartridge base block having a packing, and houses therein the above-mentioned elements of the valve cartridge, with the stop protrusions provided on the circumferential inner surface of the cartridge housing at diametrically opposite positions and engaging with the locking protrusion of the stop bushing, and stopping the extension arm of the temperature control unit during rotation of the temperature control unit.

The water control valve may have a valve body which houses the valve cartridge and is connected to the outside hot and cold water pipes.

The water control valve may further include the temperature control lever, which is connected to the exposed end of the temperature control unit outside the valve body and rotates the temperature control unit, and a flow rate control lever which is connected to the exposed end of the flow rate control unit outside the temperature control unit and rotates the flow rate control unit.

Furthermore, the first fixed disk may be partially inserted into a packing seating hole of the cartridge base block, thus being immobilized.

The cartridge base block may have hot and cold water supply holes which are connected to the outside hot and cold water pipes.

As described above, the present invention provides a water control valve which controls the temperature of water by mixing hot and cold water and controls the flow rate of the hot water, cold water or a mix of hot and cold water only through rotating motions, and has both a temperature control lever and a flow rate control lever provided at a side of a valve body. Thus, a user of the valve easily and quickly manipulates the two control levers to precise angles, so that the temperature and flow rate of water can be quickly controlled, thereby reducing the amount of needlessly consumed water. Furthermore, the two control levers are independently manipulated without interfering with each other during operation of the valve so that the valve changes neither the existing flow rate of water during a temperature control operation nor the existing temperature of water during a flow rate control operation. Thus, the valve provides operational precision. Due to the high response to manipulation, the valve is not likely to malfunction during operation.

DETAILED DESCRIPTION OF THE INVENTION

Figure 1:
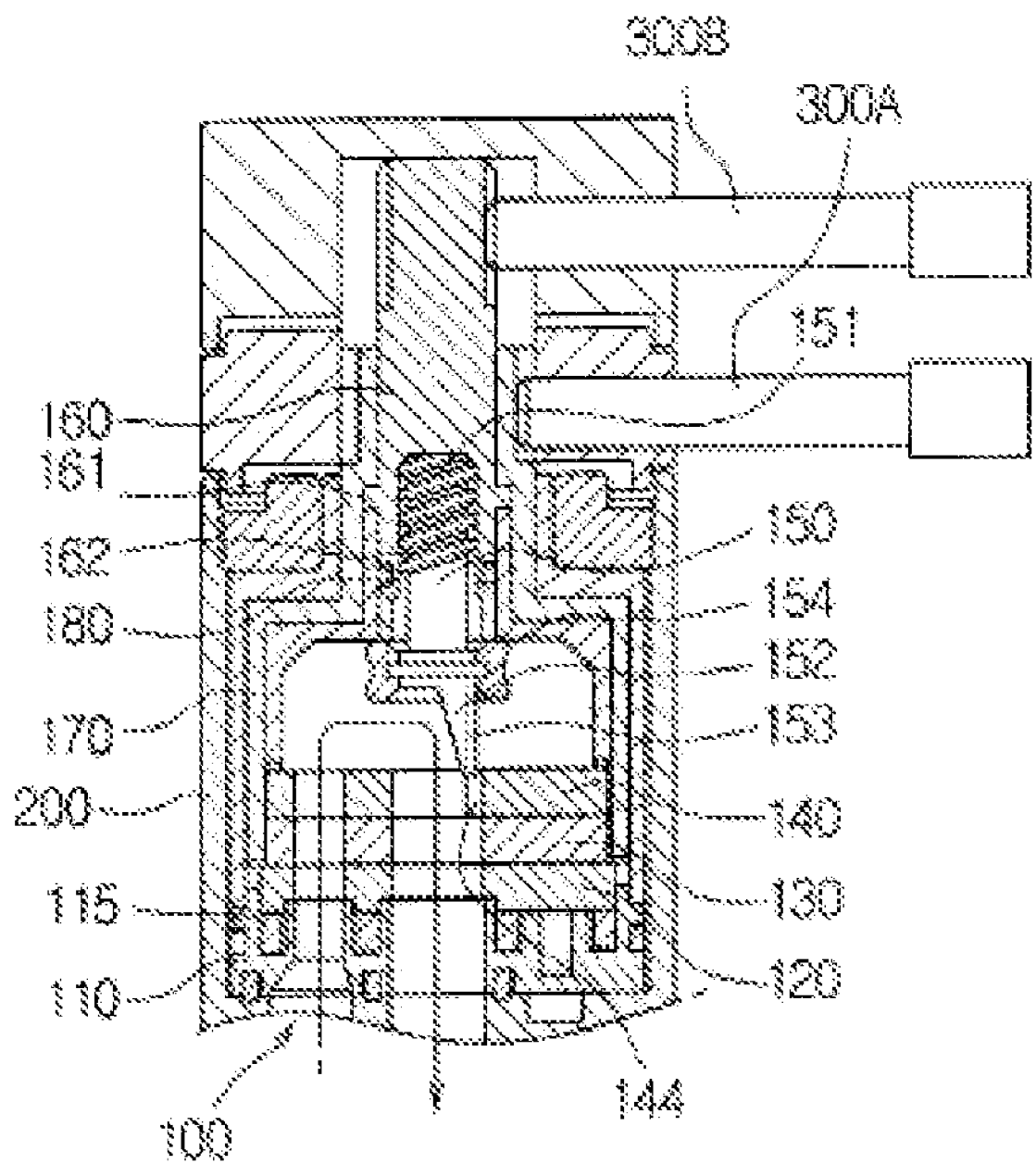
FIG. 1 is a sectional view of a water control valve according to the present invention.

Reference should now be made to the drawings, in which the same reference numerals are used throughout the different drawings to designate the same or similar components.

Figure 2:
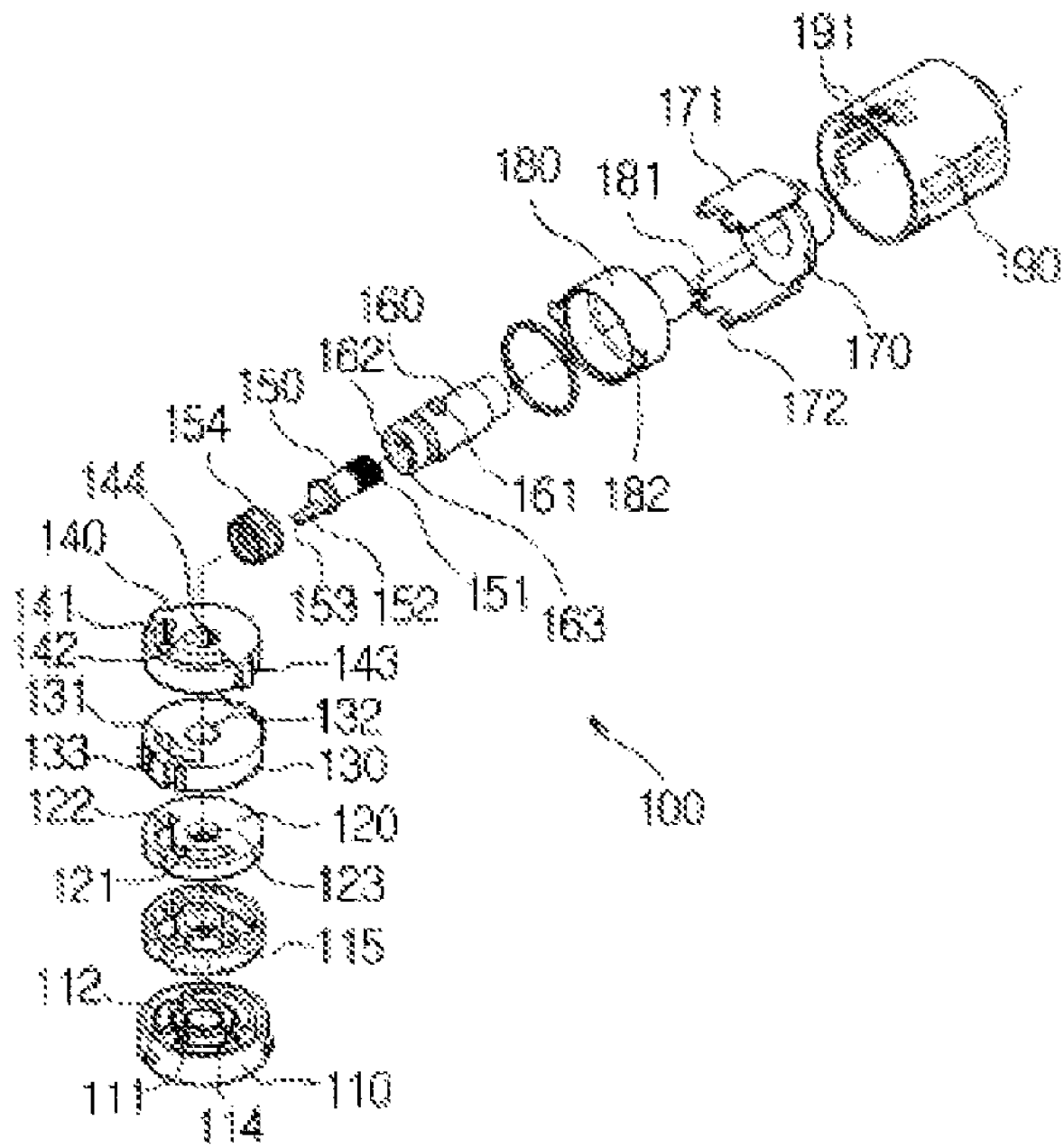
FIG. 2 is an exploded perspective view illustrating in detail the construction of a valve cartridge included in the water control valve of FIG. 1.
Figure 3:
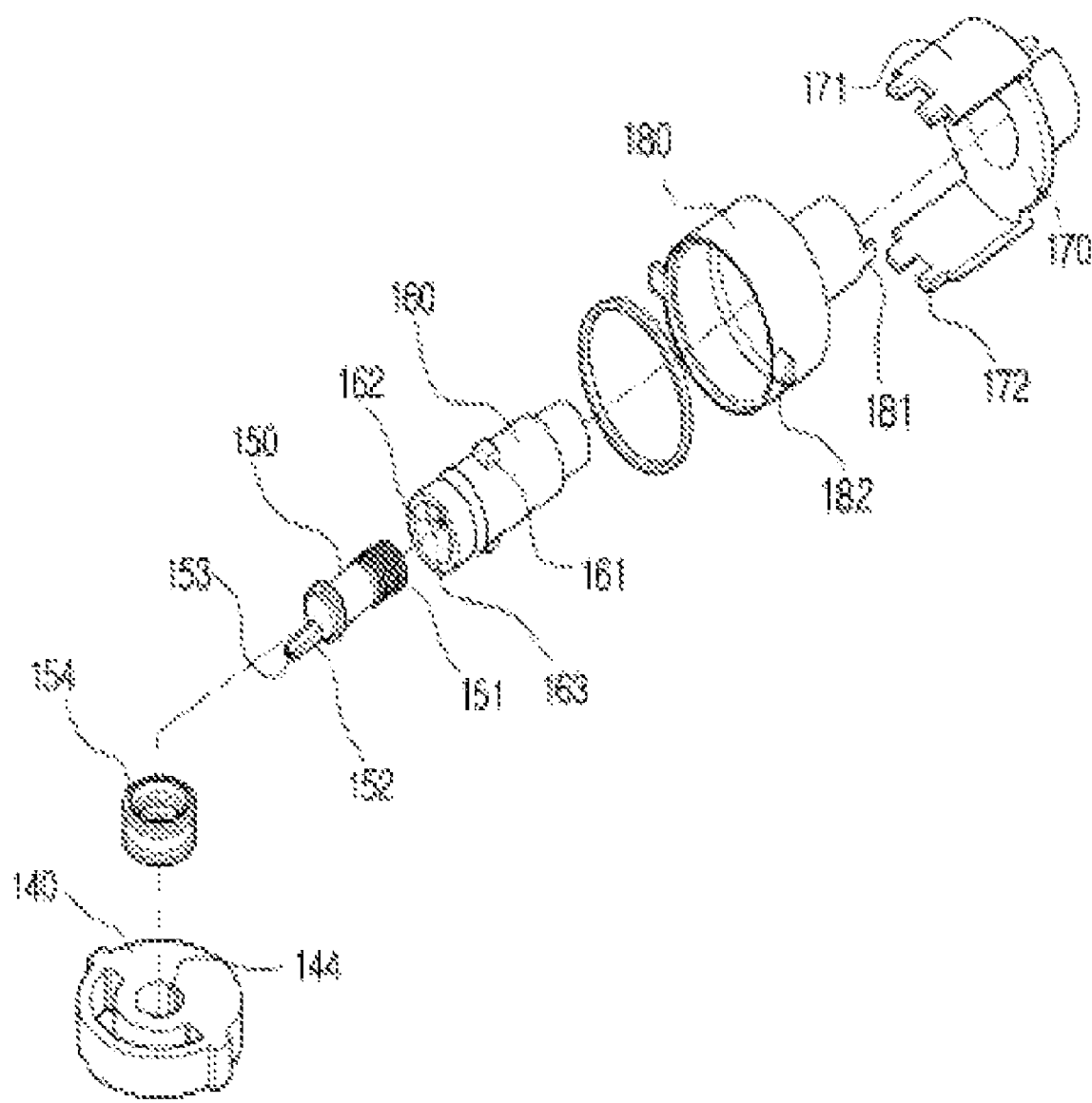
FIG. 3 is an exploded perspective view illustrating in detail the construction of both a temperature control part, stop bushing and a flow rate control part, included in the water control valve, according to the first embodiment of the present invention.

FIG. 1 is a sectional view of a water control valve according to the present invention. FIG. 2 is an exploded perspective view illustrating in detail the construction of a valve cartridge included in the water control valve. FIG. 3 is an exploded perspective view illustrating in detail the construction of both a temperature control part, stop bushing and a flow rate control part, included in the water control valve, according to the first embodiment of the present invention.

As shown in FIGS. 1 through 3, the water control valve according to the present invention comprises a first fixed disk 120 to guide hot and cold water flowing from outside water pipes (not shown) into a valve cartridge 100, a second fixed disk 140 to guide the hot water, cold water or a mix of hot and cold water in the valve cartridge 100, and a rotary disk 130 interposed between the two fixed disks 120 and 140 such that the rotary disk 130 is in surface contact with the two fixed disks 120 and 140 and controls the temperature of water by controlling the mixing ratio of the hot and cold water. To guide hot water, cold water or a mix of the hot and cold water into the valve cartridge 100, the first fixed disk 120 has hot and cold water inlet holes 121 and 122, the rotary disk 130 has a temperature control hole 131, and the second fixed disk 140 has a water passage hole 141 which is formed through the disk 140 within a predetermined rotational angular range of the temperature control hole 131 of the rotary disk 130. In the valve, the first fixed disk 120 is a circular ceramic disk having a pre-determined thickness in which the hot and cold water inlet holes 121 and 122 are formed within a semicircular range while being separated from each other such that each of the hot and cold water inlet holes 121 and 122 has an arc shape with a 90° angle around the center of the first fixed disk 120. Furthermore, to discharge the hot water, cold water or the mix of the hot and cold water from the valve cartridge 100 through a cartridge base block 110 prior to discharging the water to the outside of the valve, the first fixed disk 120, the rotary disk 130 and the second fixed disk 140 have first, second and third water discharge holes 123, 132 and 142 at the centers thereof, respectively. The water discharge holes 123, 132 and 142 of the above-mentioned disks 120, 130 and 140 are aligned and communicate with each other in an axial direction. To control the temperature of water, a user rotates a temperature control unit 170 by rotating a temperature control lever 300A so that the rotary disk 130 placed between the two fixed disks 120 and 140 is rotated to a desired angle within a predetermined angular range, thus controlling the mixing ratio of hot and cold water. To control the flow rate of water to be discharged from the valve, the user manipulates a flow rate control lever 300B of the valve. Thus, the moving unit 150, which is axially and movably inserted into a bore 163 of a cylindrical flow rate control unit 160, axially moves and controls the gap between the moving unit 150 and the water discharge hole 142 of the second fixed disk 140. Thus, the flow rate of discharged water is controlled. In the valve, the cylindrical flow rate control unit 160 is placed through stop bushing 180 in the temperature control unit 170 and by two radial stoppers 181 of the stop housing 180 and with the two radial protrusion 161 formed around the circumferential outer surface of flow rate control unit 160, the rotational angle of the flow rate control unit 160 is to be limited.

Figure 4:
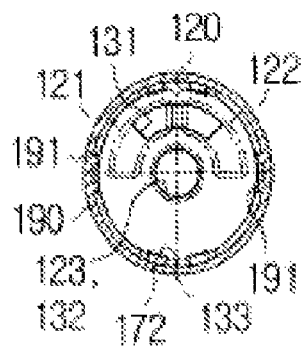
FIGS. 4 through 6 are sectional views illustrating the operation of the temperature control part of FIG. 3.
Figure 5:
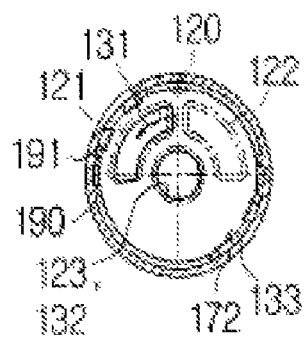
Figure 6:
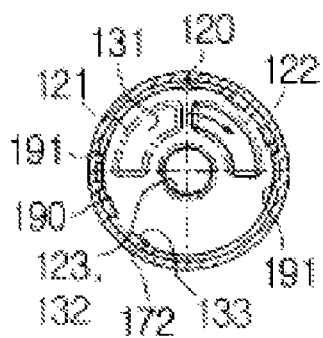

Described in detail, two locking grooves 133 are provided on the circumferential outer surface of the rotary disk 130 at each of diametrically opposite positions, as shown in FIGS. 4 through 6. The temperature control unit 170 has two extension arms 171 at diametrically opposite positions thereof, with two locking protrusions 172 provided at the end of each extension arm 171. The locking protrusions 172 of the temperature control unit 170 axially engage with the locking grooves 133 of the rotary disk 130, so that the rotary disk 130 can be rotated along with the temperature control unit 170.

Thus, the flow rates of hot and cold water passing through the hot and cold water inlet holes 121 and 122 of the first fixed disk 120 are controlled according to the amount that the temperature control hole 131 of the rotary disk 130 overlaps the hot and cold water inlet holes 121 and 122. Therefore, the valve can control the water temperature.

In the above state, the rotating angles of the rotary disk 130 are limited by two pairs of stop protrusions 191 which are provided on the circumferential inner surface of a cartridge housing 190 at diametrically opposite positions and stop the extension arms 171 of the temperature control unit 170 during rotation of the temperature control unit 170 along with the rotary disk 130.

A locking protrusion 143 is provided on the circumferential outer surface of the second fixed disk 140 at each of diametrically opposite positions. The locking protrusions 143 and the locking protrusion 182 of the stop bushing are inserted into the gaps between the stop protrusions 191 which are provided on the circumferential inner surface of the cartridge housing 190. Thus, the second fixed disk 140 and stop bushing 180 are not rotated.

Figure 7:
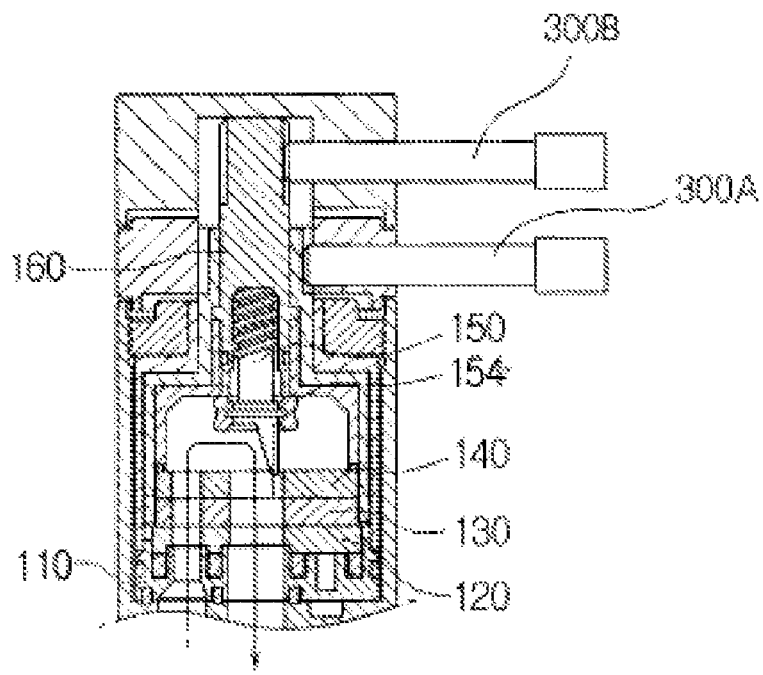
FIGS. 7 and 8 are sectional views illustrating the operation of the flow rate control part of FIG. 3.
Figure 8:
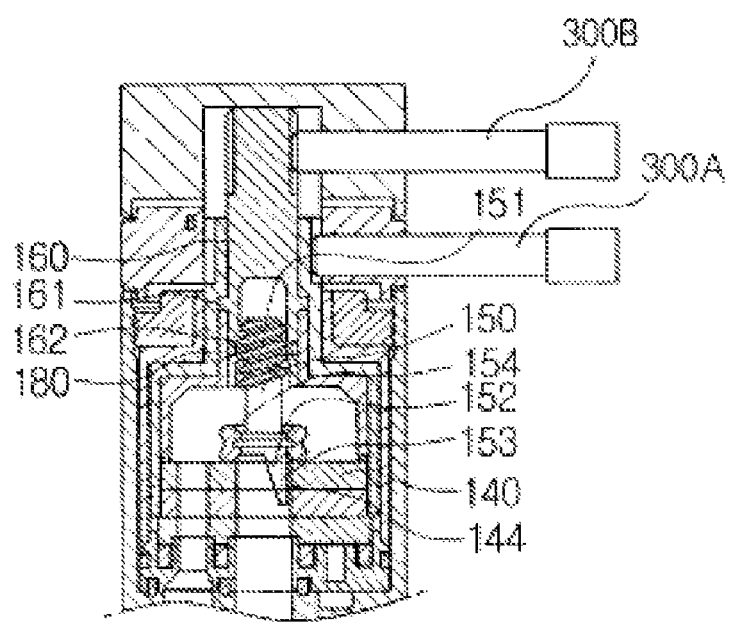

To control the flow rate of water, the user rotates the flow rate control lever 300B in either direction as shown in FIGS. 7 and 8, so that the flow rate control unit 160 is rotated in the same direction. In the above state, the cylindrical moving unit 150 having an external thread 151 at a first end thereof engages at the thread 151 with a guide protrusion 162 formed on the circumferential inner surface of the bore 163 of the flow rate control unit 160, so that the moving unit 150 intends to rotate in the flow rate control unit 160 under the guide of the guide protrusion 162 during rotation of the flow rate control unit 160. However, the moving unit 150 also has an axial guide groove 153 formed along a guide projection 152 which is provided at a second end of the moving unit 150 opposite the external thread 151 and engages at the groove 153 with an axial guide rib 144 formed on the inner surface of the water discharge hole 142 of the second fixed disk 140. Thus, the moving unit 150 cannot rotate, but axially and linearly moves in the flow rate control unit 160 during rotation of the flow rate control unit 160. The moving unit 150 further has a water control member 154 around the second end thereof. When the moving unit 150 axially and linearly moves as described above, the gap between the water discharge hole 142 of the second fixed disk 140 and the water control member 154 of the moving unit 150 is controlled. Thus, the valve controls the flow rate of discharged water. In the present invention, the external thread 151 may be formed around the moving unit 150 to form a half turn, one turn or a plurality of turns within an axial length to which the moving unit 150 moves from a retracted position thereof and reaches the water discharge hole 142 of the second fixed disk 140.

When water from the outside water pipes flows into the valve cartridge 100 through hot and cold water supply holes 111 and 112 of the cartridge base block 110 and reaches the hot and cold water inlet holes 121 and 122 of the first fixed disk 120, the hot water, cold water or a mix of the hot and cold water flows into the water passage hole 141 of the second fixed disk 140 through the temperature control hole 131 of the rotary disk 130 according to the position of the temperature control hole 131 relative to the water inlet holes 121 and 122 of the first fixed disk 120. The inlet hot water, cold water or mixed water is, thereafter, discharged to a water outlet hole 114 of the cartridge base block 110 through the water discharge holes 142, 132 and 123 of the disks 140, 130 and 120. In the above state, the flow rate of discharged water is controlled according to a gap between the water control member 154 of the moving unit 150 and the water discharge hole 142 of the second fixed disk 140. The water is, thereafter, discharged from the valve to the outside through a spout.

Figure 9:
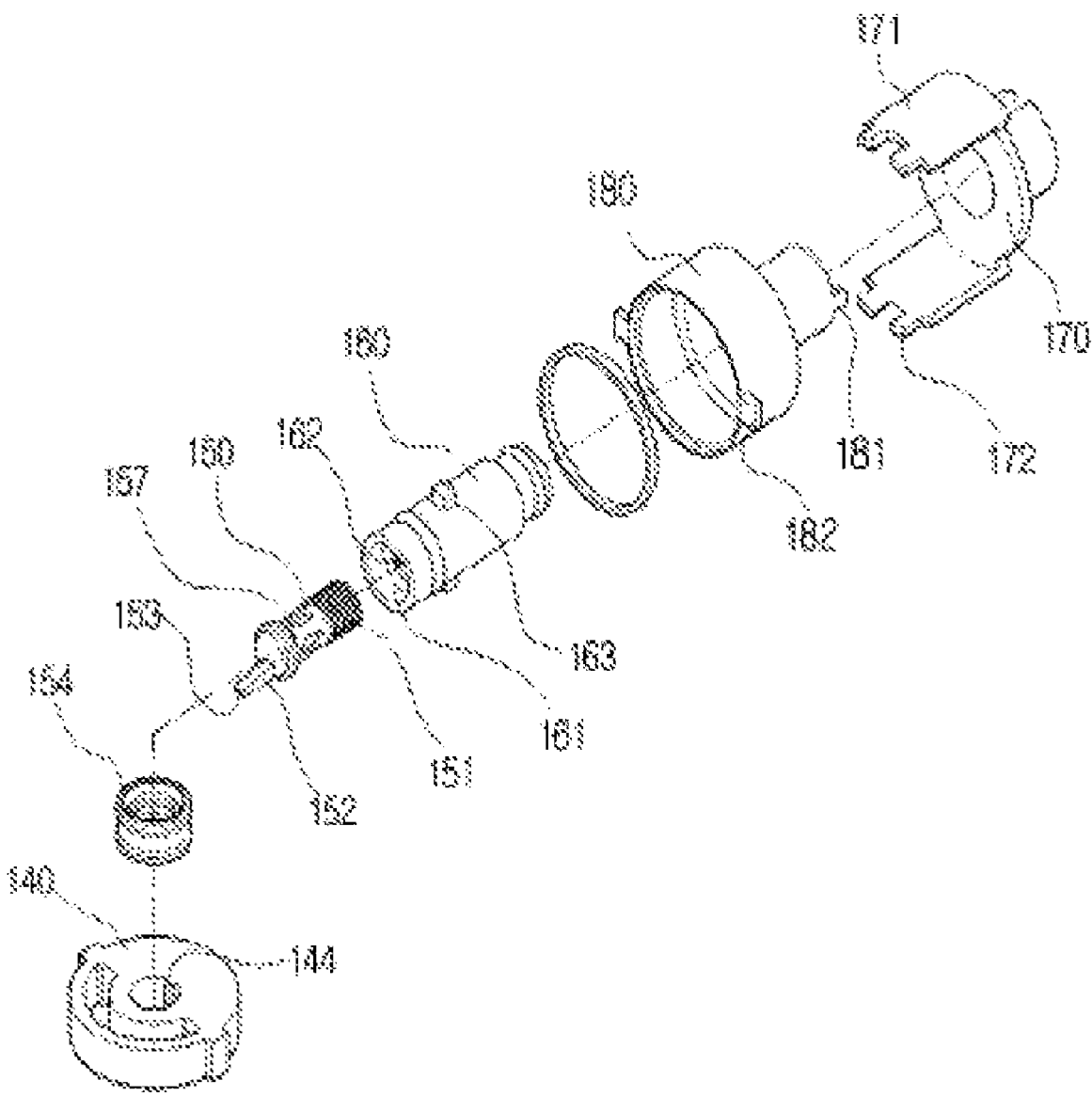
FIG. 9 is an exploded perspective view illustrating in detail the construction of a flow rate control part according to the second embodiment of the present invention.
Figure 10:
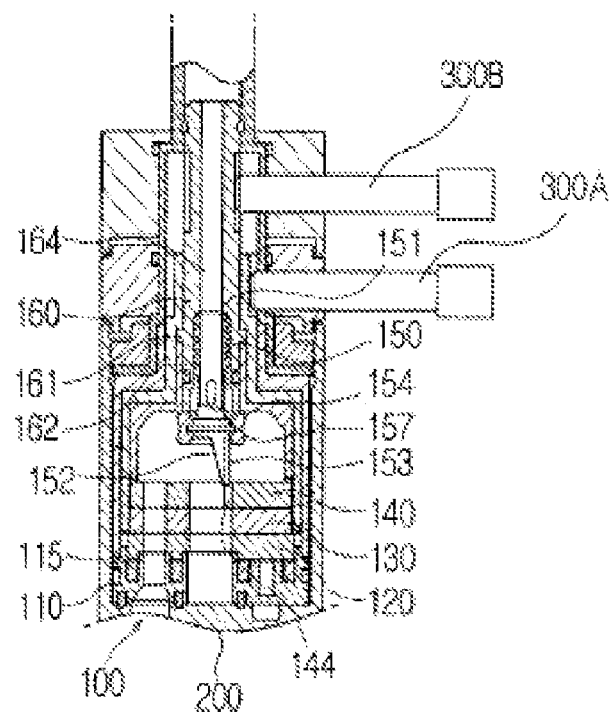
FIGS. 10 and 11 are sectional views illustrating the operation of the flow rate control part of the second embodiment of FIG. 9.
Figure 11:
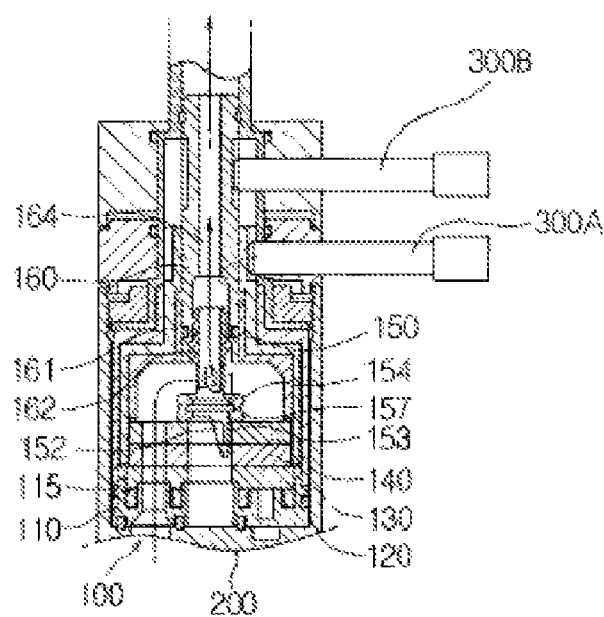

In the above-mentioned first embodiment, the valve is configured such that hot water, cold water or a mix of hot and cold water is discharged from the valve cartridge 100 through the cartridge base block 110 through which the water flowed into the valve cartridge 100. However, according to the second embodiment of the present invention, the valve may be configured such that inlet water is discharged from the valve cartridge 100 to an end of the valve opposite the cartridge base block 110 through which the water flowed into the valve cartridge 100, while stopping water flowing through the water discharge holes 123, 132 and 142 of the disks 120, 130 and 140, as shown in FIGS. 9, 10 and 11.

Described in detail, in the valve according to the second embodiment, a plurality of longitudinal holes 157 is formed around the sidewall of the moving unit 150. Furthermore, an axial path is formed through the moving unit 150 at the end thereof opposite the second fixed disk 140, while an outlet hole 164 is axially formed through the flow rate control unit 160 and communicates with the axial path of the moving unit 150.

During operation of the valve according to the second embodiment, inlet water from the water passage hole 141 of the second fixed disk 140 passes through the longitudinal holes 157 of the moving unit 150, and is discharged from the valve cartridge 100 to the end of the valve opposite the cartridge base block 110 through the outlet hole 164 of the flow rate control unit 160.

In the second embodiment, to stop water flowing from the water discharge holes 123, 132 and 142 of the disks 120, 130 and 140, the water discharge hole of a valve body 200 is closed.

In the drawings, the reference numeral 115 denotes a gasket to seal the junction of the cartridge base block 110 and the first fixed disk 120.

INDUSTRIAL APPLICABILITY

As described above, the present invention provides a water control valve which controls the temperature of water by mixing hot and cold water and controls the flow rate of the hot water, cold water or a mix of hot and cold water only through rotating motions, and has both a temperature control lever and a flow rate control lever provided at a side of a valve body. Thus, a user of the valve easily and quickly manipulates the two control levers to precise angles, so that the temperature and flow rate of water can be quickly controlled, thereby reducing the amount of needlessly consumed water. Furthermore, the two control levers are independently manipulated without interfering with each other during operation of the valve so that the valve changes neither the existing flow rate of water during a temperature control operation nor the existing temperature of water during a flow rate control operation. Due to the high response to manipulation, the valve is not likely to malfunction during operation.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A water control valve, which is configured to control a temperature of water by mixing hot and cold water and to control a flow rate of the hot water, cold water or a mix of the hot and cold water, comprising a valve cartridge, the valve cartridge comprising: a first fixed disk to guide hot and cold water flowing from outside water pipes into a valve cartridge through hot and cold water inlet holes thereof; a rotary disk with a temperature control hole formed through the rotary disk, so that the rotary disk controls by rotation the flow rate of hot and cold water according to an amount that the temperature control hole overlaps the hot and cold water inlet holes of the first fixed disk to control the temperature of water; a second fixed disk with a water passage hole formed through the second fixed disk to correspond to a predetermined rotational angular range of the temperature control hole of the rotary disk, thus guiding the hot water, cold water or the mix of the hot and cold water in the valve cartridge, the second fixed disk also supporting the rotary disk against the first fixed disk; a temperature control unit coupled to the rotary disk at a first end thereof and received into a cartridge housing at a second end thereof such that the second end is exposed outside the cartridge housing, with a temperature control lever coupled to the exposed second end of the temperature control unit so that the temperature control unit rotates the rotary disk within a predetermined rotational angular range upon rotation of the temperature control lever; first, second and third water discharge holes formed through the first fixed disk, the rotary disk and the second fixed disk, respectively, such that the first, second and third water discharge holes communicate with each other to discharge the hot water, cold water or the mix of the hot and cold water from the valve cartridge; a moving unit adapted to linearly move toward or away from the water discharge hole of the second fixed disk for controlling a gap between the moving unit and the water discharge hole of the second fixed disk to control the flow rate of discharged water; and a flow rate control unit adapted to receive therein the moving unit to cause the linear movement of the moving unit, the flow rate control unit being inserted through a stop bushing into the temperature control unit such that an end of the flow rate control unit protrudes from the temperature control unit; the stop bushing configured to prevent the interference between flow rate control unit and temperature control unit.

2. The water control valve according to claim 1, wherein the first fixed disk is a circular ceramic disk having a predetermined thickness in which the hot and cold water inlet holes are formed within a semicircular range while being separated from each other such that each of the hot and cold water inlet holes has an arc shape with a 90° angle around a center of the first fixed disk.

3. The water control valve according to claim 1, wherein the water discharge hole of the first fixed disk is formed through the center of the first fixed disk.

4. The water control valve according to claim 1, wherein the rotary disk is in surface contact with the first fixed disk and is rotated by rotation of the temperature control unit to control opening ratios of hot and cold water inlet holes of the first fixed disk by the temperature control hole thereof, and comprises: the second water discharge hole formed through the rotary disk at a position corresponding to the water discharge hole of the first fixed disk; and a locking groove provided on a circumferential outer surface of the rotary disk and fitted to an end of the temperature control unit.

5. The water control valve according to claim 1, wherein the second fixed disk is in surface contact with the rotary disk and comprises: the water passage hole formed through the second fixed disk within the predetermined rotational angular range of the temperature control hole of the rotary disk; the third water discharge hole formed through the second fixed disk at a position corresponding to the water discharge hole of the rotary disk; a locking protrusion provided on a circumferential outer surface of the second fixed disk and inserted between stop protrusions of the cartridge housing; and an axial guide rib formed on an inner surface of the third water discharge hole and engaging with an axial guide groove of the moving unit to guide the linear movement of the moving unit.

6. The water control valve according to claim 1, wherein the moving unit has a cylindrical shape with a predetermined length and comprises: an external thread formed around a first end of the moving unit; a guide projection extending from a second end of the moving unit, with an axial guide groove formed along the guide projection and engaging with an axial guide rib of the second fixed disk; and a water control member provided around the second end of the moving unit opposite the external thread.

7. The water control valve according to claim 6, wherein the external thread is formed around the moving unit within a predetermined angular range to allow the moving unit to linearly move relative to the flow rate control unit during rotation of the flow rate control unit.

8. The water control valve according to claim 7, wherein the external thread is formed around the moving unit to form a half turn within an axial length to which the moving unit moves from a retracted position thereof and reaches the water discharge hole of the second fixed disk.

9. The water control valve according to claim 7, wherein the external thread is formed around the moving unit to form one turn within an axial length to which the moving unit moves from a retracted position thereof and reaches the water discharge hole of the second fixed disk.

10. The water control valve according to claim 7, wherein the external thread is formed around the moving unit to form a plurality of turns within an axial length to which the moving unit moves from a retracted position thereof and reaches the water discharge hole of the second fixed disk.

11. The water control valve according to claim 1, wherein the flow rate control unit has a cylindrical shape with a predetermined length and comprises: a radial protrusion provided on a circumferential outer surface of the flow rate control unit at a predetermined position to limit a rotational angle of the flow rate control unit relatively with the radial stopper of the stop bushing; a bore axially formed at an end of the flow rate control unit and receiving the moving unit therein such that the moving unit linearly moves in the bore; and a guide thread formed on a circumferential inner surface of the bore and engaging with an external thread of the moving unit.

12. The water control valve according to claim 1, wherein the temperature control unit protrudes from the cartridge housing at the second end thereof from which the flow rate control unit protrudes, and comprises: an extension arm axially extending from each of diametrically opposite positions of the temperature control unit; and a locking protrusion provided at an end of the extension arm and fitted to a locking groove of the rotary disk.

13. The water control valve according to claim 1, further comprising: a longitudinal hole formed on a sidewall of the moving unit; an axial path formed through the moving unit at an end thereof opposite the second fixed disk; and an outlet hole axially formed through the flow rate control unit to communicate with the axial path of the moving unit, wherein inlet water from the water passage hole of the second fixed disk passes through the longitudinal hole of the moving unit and is discharged from the valve cartridge through the outlet hole of the flow rate control unit while stopping water flowing through the water discharge holes of the first fixed disk, the rotary disk and the second fixed disk.

14. The water control valve according to claim 13, wherein the stopping of water flowing through the water discharge holes of the first fixed disk, the rotary disk and the second fixed disk is accomplished by closing a water discharge hole of a valve body.

* * * * *